(12) United States Patent
Yang et al.

(10) Patent No.: US 11,915,048 B2
(45) Date of Patent: Feb. 27, 2024

(54) METHOD OF SCHEDULING JOBS IN STORAGE DEVICE USING PRE-DEFINED TIME AND METHOD OF OPERATING STORAGE SYSTEM INCLUDING THE SAME

(71) Applicant: SAMSUNG ELECTRONICS CO., LTD., Suwon-si (KR)

(72) Inventors: Kyungbo Yang, Suwon-si (KR); Daehyun Kim, Suwon-si (KR); Dongik Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 804 days.

(21) Appl. No.: 17/003,455

(22) Filed: Aug. 26, 2020

(65) Prior Publication Data

US 2021/0200586 A1    Jul. 1, 2021

(30) Foreign Application Priority Data

Dec. 26, 2019    (KR) .......................... 10-2019-0174906

(51) Int. Cl.
*G06F 3/06* (2006.01)
*G06F 9/48* (2006.01)

(52) U.S. Cl.
CPC ............ *G06F 9/4887* (2013.01); *G06F 3/061* (2013.01); *G06F 3/0604* (2013.01); *G06F 3/0659* (2013.01); *G06F 3/0673* (2013.01)

(58) Field of Classification Search
CPC .... G06F 9/4887; G06F 3/0604; G06F 3/0659; G06F 3/0673; G06F 2209/486; G06F 3/0679; G06F 3/061; G06F 3/064; G06F 3/0652; G06F 3/0656; G06F 3/0658; G06F 3/0689; G06F 3/0614; G06F 13/161; G06F 13/18

See application file for complete search history.

(56) References Cited

U.S. PATENT DOCUMENTS

| | | |
|---|---|---|
| 6,975,638 B1 | 12/2005 | Chen et al. |
| 7,461,159 B2 | 12/2008 | Tayyar et al. |
| 8,411,496 B2 | 4/2013 | Hong |
| 9,400,615 B2 | 7/2016 | McKean et al. |

(Continued)

FOREIGN PATENT DOCUMENTS

| | | |
|---|---|---|
| KR | 10-1446441 | 9/2014 |
| KR | 10-1655008 | 8/2016 |

OTHER PUBLICATIONS

Extended European search report dated May 31, 2021 from the European Patent Office in corresponding European Patent Application No. 20217165.8.

*Primary Examiner* — Sisley N Kim

(74) *Attorney, Agent, or Firm* — F. Chau & Associates, LLC

(57) ABSTRACT

In a method of scheduling jobs in a storage device, a first job is performed. While the first job is being performed, a first timestamp for the first job is pre-updated based on a pre-defined operation time table that represents a relationship between operations of the storage device and operation times. While the first job is being performed, scheduling requests are received that are associated with a second job to be performed after the first job. While the first job is being performed, a scheduling operation for selecting the second job is pre-performed based on the scheduling requests and the timestamps.

20 Claims, 15 Drawing Sheets

(56) References Cited

U.S. PATENT DOCUMENTS

| | | |
|---|---|---|
| 9,535,627 B2 | 1/2017 | Roberts et al. |
| 2011/0225583 A1 | 9/2011 | Suh et al. |
| 2017/0024132 A1* | 1/2017 | Jun .................... G06F 3/0604 |
| 2017/0262337 A1 | 9/2017 | Chang et al. |
| 2018/0150242 A1* | 5/2018 | Yi ...................... G06F 3/0656 |
| 2018/0239651 A1* | 8/2018 | Gong ................ G06F 12/0813 |
| 2020/0057578 A1* | 2/2020 | Benisty ................ G06F 3/064 |

\* cited by examiner

720

| | PFMR1 (WT1) | PFMR2 (WT2) | ... | PFMRN (WTN) |
|---|---|---|---|---|
| RD0 | TR1 | TR2 | ... | TRN |
| WR0 | TW1 | TW2 | ... | TWN |
| ER0 | TE1 | TE2 | ... | TEN |
| ⋮ | ⋮ | ⋮ | | ⋮ |

METHOD OF SCHEDULING JOBS IN STORAGE DEVICE USING PRE-DEFINED TIME AND METHOD OF OPERATING STORAGE SYSTEM INCLUDING THE SAME

CROSS-REFERENCE

This application claims priority under 35 USC § 119 to Korean Patent Application No. 10-2019-0174906, filed on Dec. 26, 2019 in the Korean Intellectual Property Office (KIPO), the contents of which are herein incorporated by reference in their entirety.

TECHNICAL FIELD

Exemplary embodiments relate generally to semiconductor integrated circuits, and more particularly to methods of scheduling jobs in storage devices using pre-defined time and methods of operating storage systems using the methods of scheduling jobs.

DISCUSSION OF RELATED ART

Certain types of data storage devices include one or more semiconductor memory devices. Examples of such data storage devices include solid-state drives (SSDs). These types of data storage devices may have various design and/or performance advantages over hard disk drives (HDDs). Examples of potential advantages include the absence of moving mechanical parts above the sub-atomic level, higher data access speeds, stability, durability, and/or low power consumption. Recently, various systems such as laptop computers, automobiles, airplanes, drones, and the like, have adopted such SSDs for data storage.

Such systems may be implemented to perform multi-tasking in which various jobs or tasks are simultaneously performed. While performing the multi-tasking, the storage device may be simultaneously accessed by a plurality of jobs or tasks.

SUMMARY

At least one exemplary embodiment of the present disclosure provides a method of internally scheduling jobs or tasks in a storage device using a pre-defined time.

At least one exemplary embodiment of the present disclosure provides a method of operating a storage system using a method of scheduling jobs or tasks.

At least one exemplary embodiment of the present disclosure provides a method of scheduling jobs or tasks in a storage device where the priority and/or throughput for the plurality of jobs or tasks is controlled by the storage device.

According to an exemplary embodiment, in a method of scheduling jobs in a storage device, a first job that is pre-selected is performed. While the first job is performed, a first timestamp for the first job among a plurality of timestamps is pre-updated based on a pre-defined operation time table that represents a relationship between a plurality of operations of the storage device and operation times. While the first job is performed, a plurality of scheduling requests associated with a second job to be performed subsequently are received. While the first job is performed, a scheduling operation for selecting the second job is pre-performed based on the plurality of scheduling requests and the plurality of timestamps.

According to an exemplary embodiment, in a method of operating a storage system that includes at least one host device and a storage device, a first job that is pre-selected is performed by the storage device. While the first job is performed, a first timestamp for the first job among a plurality of timestamps is pre-updated by the storage device based on a pre-defined operation time table that is stored in the storage device and represents a relationship between a plurality of operations of the storage device and operation times. While the first job is performed, a plurality of scheduling requests are transmitting by the host device to the storage device. The plurality of scheduling requests are associated with a second job to be performed subsequently by the storage device. While the first job is performed, a scheduling operation for selecting the second job is pre-performed by the storage device based on the plurality of scheduling requests and the plurality of timestamps.

According to an exemplary embodiment, in a method of scheduling jobs in a storage device, a first scheduling operation for selecting a first job is performed based on a plurality of first scheduling requests and a plurality of timestamps. The first job selected by the first scheduling operation is performed. While the first job is performed, a first timestamp for the first job among the plurality of timestamps is updated based on a pre-defined operation time table that represents a relationship between a plurality of operations of the storage device and operation times. While the first job is performed, a plurality of second scheduling requests associated with a second job to be performed subsequently are received. While the first job is performed, a second scheduling operation for selecting the second job is performed based on the plurality of second scheduling requests and the plurality of timestamps. Immediately after the first job is completed, the second job selected by the second scheduling operation is performed. While the second job is performed, the first timestamp for the first job is post-compensated. While the second job is performed and after the first timestamp is post-compensated, a second timestamp for the second job among the plurality of timestamps is updated based on the pre-defined operation time table. The plurality of timestamps correspond to a plurality of job performers to which different weights are assigned. The operation times of the plurality of operations of the storage device that are included in the pre-defined operation time table are set differently for the plurality of job performers based on the different weights.

In the method of scheduling jobs and the method of operating the storage system according to an exemplary embodiment, an operation of updating a timestamp for a current job and a scheduling operation for selecting a next job may be performed while the current job is performed. In other words, the timestamp update operation for the current job and the scheduling operation for the next job may overlap with the execution of the current job. In addition, since the timestamp update operation for the current job is performed before the current job is completed, the timestamp update operation for the current job may be performed using a pre-defined operation time (e.g., a predicted execution time) stored in the pre-defined operation time table rather than an actual execution time of the current job. Accordingly, the latency overhead may be reduced, removed or eliminated because a time for updating the timestamp of the current job and a time for scheduling the next job are not required between the current job and the next job, and thus the scheduling performance of the storage device may be improved or enhanced. In addition, the timestamp of the current job may be post-compensated based on the actual execution time of the current job after the current job is completed, and thus the accuracy of the scheduling operation can be improved.

According to an exemplary embodiment, the latency overhead overlap, or removal thereof, and the accurate scheduling may be simultaneously performed by removing disadvantages of alternate schemes while adopting advantages thereof.

According to an exemplary embodiment, a method of scheduling jobs in a storage device includes: pre-defining an operation time table that represents a relationship between a plurality of operations of the storage device and expected operation times thereof; receiving a plurality of scheduling requests associated with a plurality of timestamps for a plurality of jobs each having at least one operation; performing a first job from the plurality of jobs having a first operation that is pre-selected; while the first job is being performed, pre-updating a first timestamp for the first job among a plurality of timestamps based on the first operation and the a pre-defined operation time table that represents a relationship between a plurality of operations of the storage device and operation times; while the first job is performed, receiving a plurality of scheduling requests associated with a second job to be performed subsequently; and while the first job is being performed, pre-performing a scheduling operation for selecting the a second job from the plurality of jobs to be performed subsequent to the first job based on the plurality of scheduling requests and the plurality of timestamps.

According to an exemplary embodiment, a method of operating a storage system, which includes at least one host device and a storage device, includes: performing, by the storage device, a first job that is pre-selected; while the first job is being performed, pre-updating, by the storage device, a first completion timestamp for the first job among a plurality of timestamps based on a pre-defined operation time table that is stored in the storage device and represents a relationship between a plurality of operations of the storage device and predicted operation times thereof; while the first job is being performed by the storage device, transmitting, by the at least one host device, a plurality of scheduling requests to the storage device, the plurality of scheduling requests being associated with a second job to be performed subsequently subsequent to the first job by the storage device; and while the first job is being performed, pre-performing, by the storage device, a scheduling operation for selecting the second job based on the plurality of scheduling requests and the plurality of timestamps.

According to an exemplary embodiment, a storage device includes: a storage controller connected to at least one non-volatile memory; and a scheduler connected to the storage controller, wherein the scheduler is configured for receiving a plurality of scheduling requests associated with a plurality of timestamps for a plurality of jobs each having at least one operation with respect to the at least one non-volatile memory, wherein the storage controller is configured for performing a first job from the plurality of jobs having a first operation with respect to the at least one non-volatile memory, wherein the scheduler is further configured for pre-updating a first timestamp for the first job based on the first operation and a pre-defined operation time table, while the first job is being performed, wherein the scheduler is further configured for pre-performing a scheduling operation for selecting a second job from the plurality of jobs to be performed subsequent to the first job based on the plurality of scheduling requests and the plurality of timestamps, while the first job is being performed, wherein the storage controller is configured for performing the second job from the plurality of jobs having a second operation with respect to the at least one non-volatile memory, immediately after the first job is complete.

BRIEF DESCRIPTION OF THE DRAWINGS

Illustrative, non-limiting exemplary embodiments will be more clearly understood from the following detailed description taken in conjunction with the accompanying drawings.

DETAILED DESCRIPTION

Figure 1:
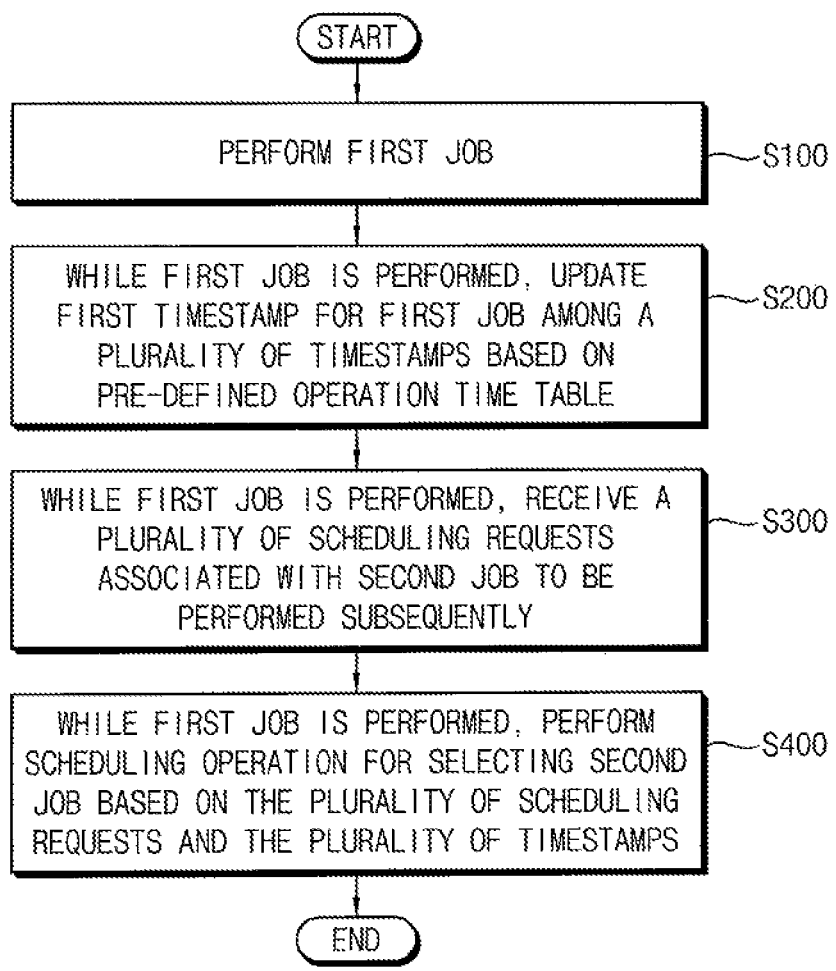
FIG. 1 is a flowchart diagram illustrating a method of scheduling jobs in a storage device using a pre-defined time according to an exemplary embodiment.

The present disclosure will be described more fully with reference to the accompanying drawings, in which exemplary embodiments are shown. The present disclosure may, however, be embodied in many different forms and should not be construed as limited to the exemplary embodiments set forth herein. Like reference numerals may refer to like elements throughout this application.

Figure 2:
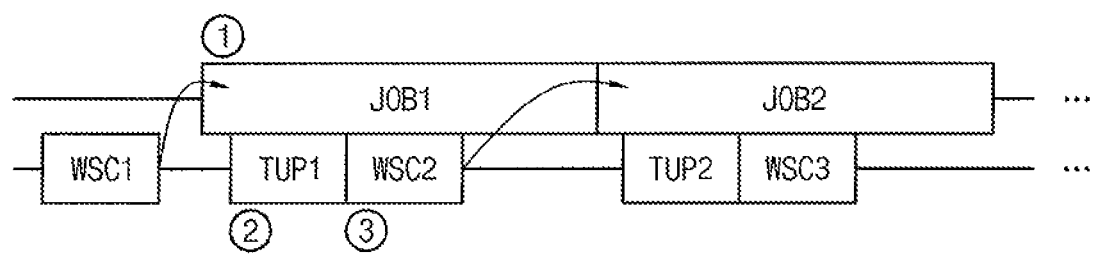
FIG. 2 is a hybrid timing diagram for describing a method of scheduling jobs in a storage device of FIG. 1.

FIG. 1 illustrates a method of scheduling jobs in a storage device using a pre-defined time according to an exemplary embodiment. FIG. 2 illustrates jobs scheduled in a storage device using the method of FIG. 1.

Referring to FIGS. 1 and 2, a storage device according to an exemplary embodiment includes a plurality of nonvolatile memories that store data, and a storage controller that controls an operation of the plurality of nonvolatile memories. In addition, the storage device includes a scheduler for scheduling jobs, tasks or operations. Configurations of the storage device and a storage system including the storage device will be described with reference to FIG. 3.

In a method of scheduling jobs in the storage device according to an exemplary embodiment, a first job JOB1 that is pre-selected (or is selected in advance) is performed (step S100). An operation ① in FIG. 2 may indicate step S100 in FIG. 1.

For example, the first job JOB1 may be selected by performing a scheduling operation WSC1 that is substantially the same as a scheduling operation WSC2 which will be described in step S400. The scheduling operation WSC1 for selecting the first job JOB1 may be performed before step S100. For another example, although not illustrated in FIG. 2, when only one scheduling request is received or when the first job JOB1 is the front or foremost job to be performed, the scheduling operation WSC1 may be omitted and the first job JOB1 may be immediately performed without the scheduling operation WSC1.

While the first job JOB1 is being performed, a first timestamp for the first job JOB1 among a plurality of timestamps is updated based on a pre-defined operation time table (step S200). An operation ② in FIG. 2 may indicate an operation TUP1 of updating the first timestamp in step S200 of FIG. 1. Step S200 may be pre-performed (or performed in advance) before the first job JOB1 is completed. In other words, the first timestamp may be pre-updated (or updated in advance) before the first job JOB1 is completed. Step S200 will be described in detail with reference to FIG. 10.

The pre-defined operation time table represents a relationship between a plurality of operations of the storage device and operation times. A plurality of jobs including the first job JOB1, a second job JOB2, and the like may be jobs associated with or related to the plurality of operations of the storage device. For example, as will be described later, the plurality of operations of the storage device may include a data read operation, a data write operation, a data erase operation, and the like on the storage device. The pre-defined operation time table will be described in detail with reference to FIG. 7.

The plurality of timestamps may correspond to a plurality of job performers that are subjects or parties performing the plurality of jobs, and may represent, for example, accumulated times (or cumulative times) in which the plurality of job performers have used (e.g., accessed) the storage device cumulatively. For example, as will be described later, the accumulated time may not correspond to an actual execution time, and may be obtained by accumulating a predicted execution time (or an estimated execution time or an expected execution time) based on the pre-defined operation time table. The plurality of timestamps will be described in detail with reference to FIG. 9.

While the first job JOB1 is performed, a plurality of scheduling requests associated with the second job JOB2 to be performed subsequently are received (step S300). Each of the plurality of scheduling requests may be received or transmitted with a respective one of a plurality of jobs. While the first job JOB1 is performed, the scheduling operation WSC2 for selecting the second job JOB2 is performed based on the plurality of scheduling requests and the plurality of timestamps (step S400). An operation ③ in FIG. 2 may indicate step S400 in FIG. 1. Steps S300 and S400 may also be pre-performed (or performed in advance) before the first job JOB1 is completed. Step S400 will be described in detail with reference to FIG. 8.

In some exemplary embodiments, at least one scheduling operation such as the scheduling operations WSC1 and WSC2, may be performed based on a weighted fair queuing (WFQ) scheme. For example, the scheduler included in the storage device may be a WFQ scheduler.

Although the steps of FIG. 1 may be described based on the operations while the first job JOB1 is performed, operations while the second job JOB2 is performed may also be substantially the same those of FIG. 1, as illustrated in FIG. 2 or which may be described with reference to FIG. 12. For example, the second job JOB2 may be performed after (e.g., immediately after) the first job JOB1 is completed. While the second job JOB2 is performed, a second timestamp for the second job JOB2 among the plurality of timestamps may be updated based on the pre-defined operation time table (e.g., an operation TUP2 in FIG. 2). While the second job JOB2 is performed, a plurality of scheduling requests may be received associated with a third job to be performed subsequent to the second job. While the second job JOB2 is being performed, a scheduling operation for selecting the third job may be performed based on the plurality of scheduling requests and the plurality of timestamps. If the plurality of scheduling requests are not transmitted or received, the storage device may wait to receive subsequent scheduling requests.

In a non-preferred WFQ scheme, a timestamp update operation and a scheduling operation are performed after a corresponding job is completed. On the other hand, in the WFQ scheme in the method of scheduling jobs in the storage device according to exemplary embodiments, the operation TUP1 of updating the first timestamp for the first job JOB1 and the scheduling operation WSC2 for selecting the second job JOB2 to be performed subsequently may be performed while the first job JOB1 is being performed and before the first job JOB1 is completed. In other words, a timestamp update operation for a current job and a scheduling operation for a next job (or a subsequent job) may concurrently overlap with an execution of the current job. In addition, since the timestamp update operation for the current job is performed before the current job is completed, the timestamp update operation for the current job may be performed using a pre-defined operation time (e.g., a predicted execution time) stored in the pre-defined operation time table rather than an actual execution time of the current job. Accordingly, the latency overhead may be reduced, removed or eliminated because a time for updating the timestamp of the current job and a time for scheduling the next job are not required between the current job and the next job, and thus the scheduling performance of the storage device may be improved or enhanced.

Figure 3:
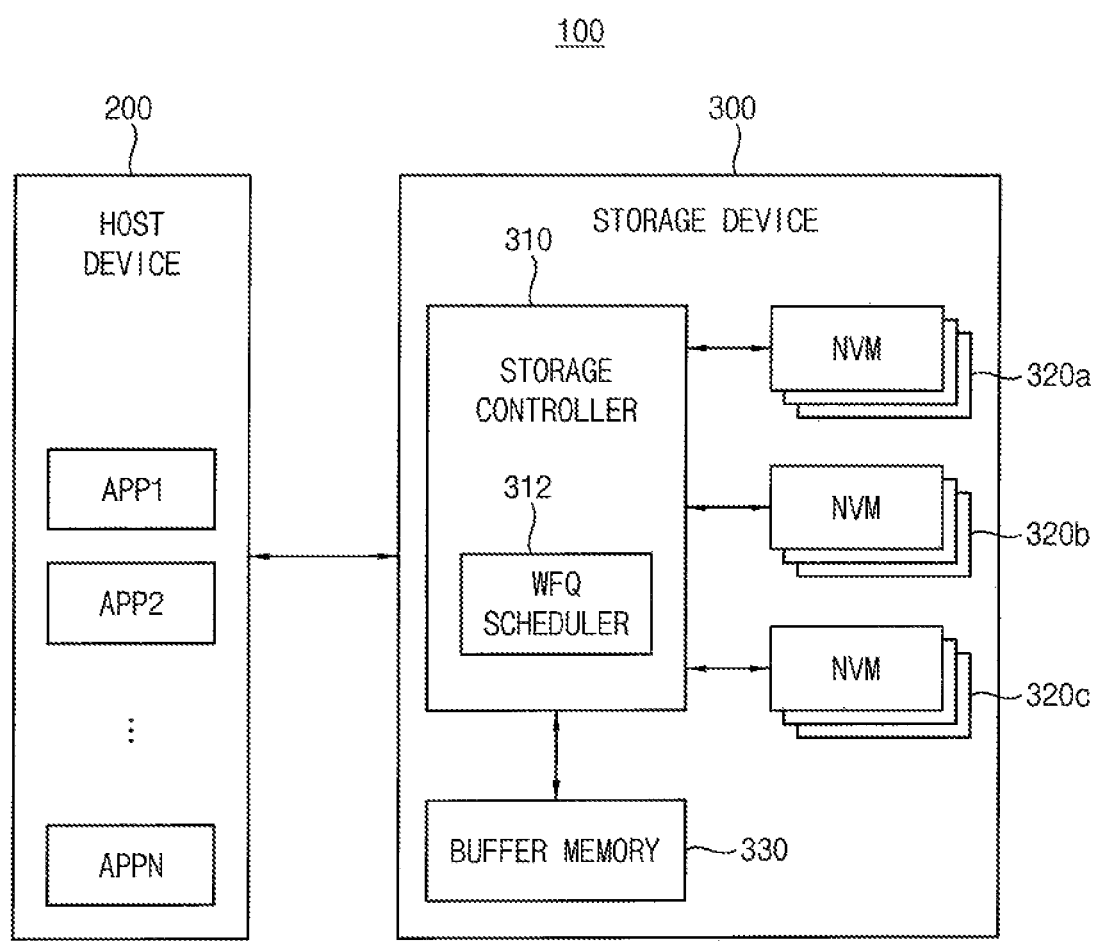
FIG. 3 is a schematic block diagram illustrating a storage device and a storage system including the storage device according to an exemplary embodiment.

FIG. 3 illustrates a storage device and a storage system including the storage device according to an exemplary embodiment.

Referring to FIG. 3, a storage system 100 includes a host device 200 and a storage device 300.

The host device 200 controls overall operations of the storage system 100. Although not illustrated in FIG. 3, the host device 200 may include a host processor and a host memory. The host processor may control an operation of the host device 200. For example, the host processor may execute an operating system (OS). The host memory may store instructions and/or data that are executed and/or processed by the host processor. For example, the operating system executed by the host processor may include a file system for file management and a device driver for controlling peripheral devices including the storage device 300 at the operating system level.

In addition, the host device 200 may execute a plurality of applications APP1, APP2, . . . , APPN that are different from each other and are driven or run on the operating system. For example, the plurality of applications APP1 to APPN may provide an Internet browser, a game, a video, a camera, and the like. The plurality of applications APP1 to APPN may generate a plurality of jobs and a plurality of scheduling requests for using or accessing the storage device 300 (e.g., for writing, reading and/or erasing data, or the like). In other words, the plurality of job performers, which are subjects or parties performing the plurality of jobs described with reference to FIG. 1, may include the plurality of applications APP1 to APPN.

The storage device 300 is accessed by the host device 200. The storage device 300 may include a storage controller 310, a plurality of nonvolatile memories 320a, 320b and 320c, and a buffer memory 330.

The storage controller 310 may control an operation of the storage device 300 and/or operations of the plurality of nonvolatile memories 320a, 320b and 320c based on a command, an address and data that are received from the host device 200.

The storage controller 310 includes a WFQ scheduler 312. The WFQ scheduler 312 may perform the method described with reference to FIG. 1. For example, the storage device 300 may perform a current job that is pre-selected by the WFQ scheduler 312, and the WFQ scheduler 312 may perform an operation of updating a timestamp for the current job, an operation of receiving scheduling requests associated with a next job and a scheduling operation for selecting the next job, while the current job is performed. In other words, the WFQ scheduler 312 may perform the timestamp update operation and the job scheduling operation such that the latency overhead between the current job and the next job is reduced or removed. In addition, the WFQ scheduler 312 may perform a method which will be described with reference to FIG. 12.

The plurality of nonvolatile memories 320a, 320b and 320c may store a plurality of data. For example, the plurality of nonvolatile memories 320a, 320b and 320c may store meta data, various user data, or the like.

In some exemplary embodiments, each of the plurality of nonvolatile memories 320a, 320b and 320c may include a NAND flash memory. In other exemplary embodiments, each of the plurality of nonvolatile memories 320a, 320b and 320c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The buffer memory 330 may store instructions and/or data that are executed and/or processed by the storage controller 310, and may temporarily store data stored in or to be stored into the plurality of nonvolatile memories 320a, 320b and 320c. For example, the buffer memory 330 may include at least one of various volatile memories, e.g., a dynamic random-access memory (DRAM), a static random-access memory (SRAM), or the like.

In some exemplary embodiments, the storage device 300 may be a solid-state drive (SSD). In other exemplary embodiments, the storage device 300 may be a universal flash storage (UFS), a multimedia card (MMC) or an embedded multimedia card (eMMC). In still other exemplary embodiments, the storage device 300 may be one of a secure digital (SD) card, a micro SD card, a memory stick, a chip card, a universal serial bus (USB) card, a smart card, a compact flash (CF) card, or the like.

In some exemplary embodiments, the storage device 300 may be connected to the host device 200 through a block accessible interface which may include, for example, a UFS, an eMMC, a serial advanced technology attachment (SATA) bus, a nonvolatile memory express (NVMe) bus, a serial attached SCSI (SAS) bus, or the like. The storage device 300 may use a block accessible address space corresponding to an access size of the plurality of nonvolatile memories 320a, 320b and 320c to provide the block accessible interface to the host device 200, for allowing the access by units of a memory block with respect to data stored in the plurality of nonvolatile memories 320a, 320b and 320c.

Figure 4:
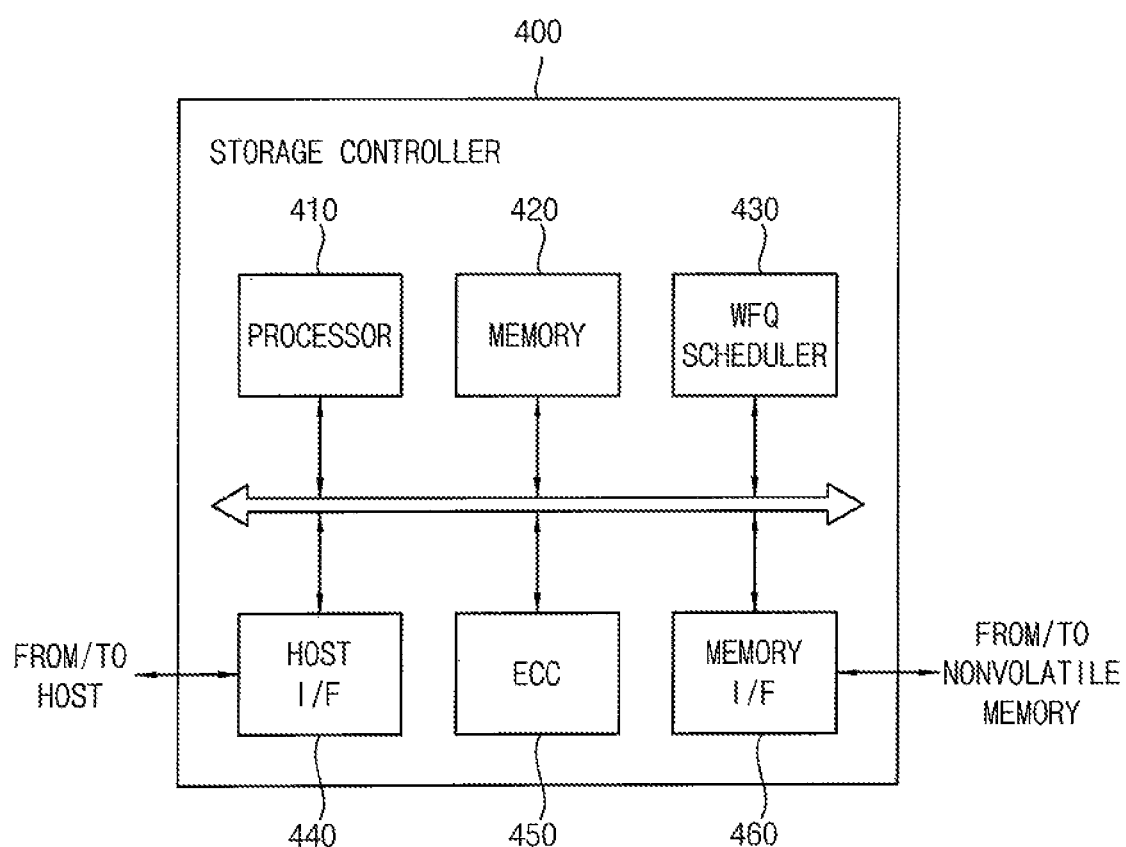
FIG. 4 is a schematic block diagram illustrating an example of a storage controller included in a storage device according to an exemplary embodiment.

In some exemplary embodiments, the storage system 100 may be any computing system, such as a personal computer (PC), a server computer, a data center, a workstation, a digital television, a set-top box, a navigation system, or the like In other exemplary embodiments, the storage system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, or the like FIG. 4 illustrates an example of a storage controller included in a storage device according to an exemplary embodiment.

Referring to FIG. 4, a storage controller 400 may include at least one processor 410, a memory 420, a WFQ scheduler 430, a host interface 440, an error correction code (ECC) block 450 and a memory interface 460.

The processor 410 may control an operation of the storage controller 400 in response to a command received via the host interface 440 from a host device (e.g., the host device 200 in FIG. 3). In some exemplary embodiments, the processor 410 may control respective components by employing firmware for operating a storage device (e.g., the storage device 300 in FIG. 3).

The memory 420 may store instructions and data executed and processed by the processor 410. For example, the memory 420 may be implemented with a volatile memory device with relatively small capacity and high speed, such as a static random-access memory (SRAM), a cache memory, or the like.

The WFQ scheduler 430 for performing the job scheduling operation may be substantially the same as the WFQ scheduler 312 in FIG. 3. In some exemplary embodiments, at least a part of the WFQ scheduler 430 may be implemented as hardware. For example, at least a part of the WFQ scheduler 430 may be included in a computer-based electronic system. In other exemplary embodiments, at least a part of the WFQ scheduler 430 may be implemented as instruction codes or program routines (e.g., a software program). For example, the instruction codes or the program routines may be executed by a computer-based electronic system, and may be stored in any storage device located inside or outside the computer-based electronic system.

The ECC block 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), or the like, or may perform ECC encoding and ECC decoding using above-described codes or other error correction codes.

The host interface 440 may provide physical connections between the host device 200 and the storage device 300. The host interface 440 may provide an interface corresponding to a bus format of the host for communication between the host device 200 and the storage device 300. In some exemplary embodiments, the bus format of the host device 200 may be a small computer system interface (SCSI) or a serial attached SCSI (SAS) interface. In other exemplary embodiments, the bus format of the host device 200 may be a USB, a peripheral component interconnect (PCI) express (PCIe), an advanced technology attachment (ATA), a parallel ATA (PATA), a serial ATA (SATA), a nonvolatile memory (NVM) express (NVMe), or the like, format.

The memory interface 460 may exchange data with nonvolatile memories (e.g., the nonvolatile memories 320a, 320b and 320c in FIG. 3). The memory interface 460 may transfer data to the nonvolatile memories 320a, 320b and 320c, or may receive data read from the nonvolatile memories 320a, 320b and 320c. In some exemplary embodiments, the memory interface 460 may be connected to the nonvolatile memories 320a, 320b and 320c via one channel. In other exemplary embodiments, the memory interface 460 may be connected to the nonvolatile memories 320a, 320b and 320c via two or more channels.

Figure 5:
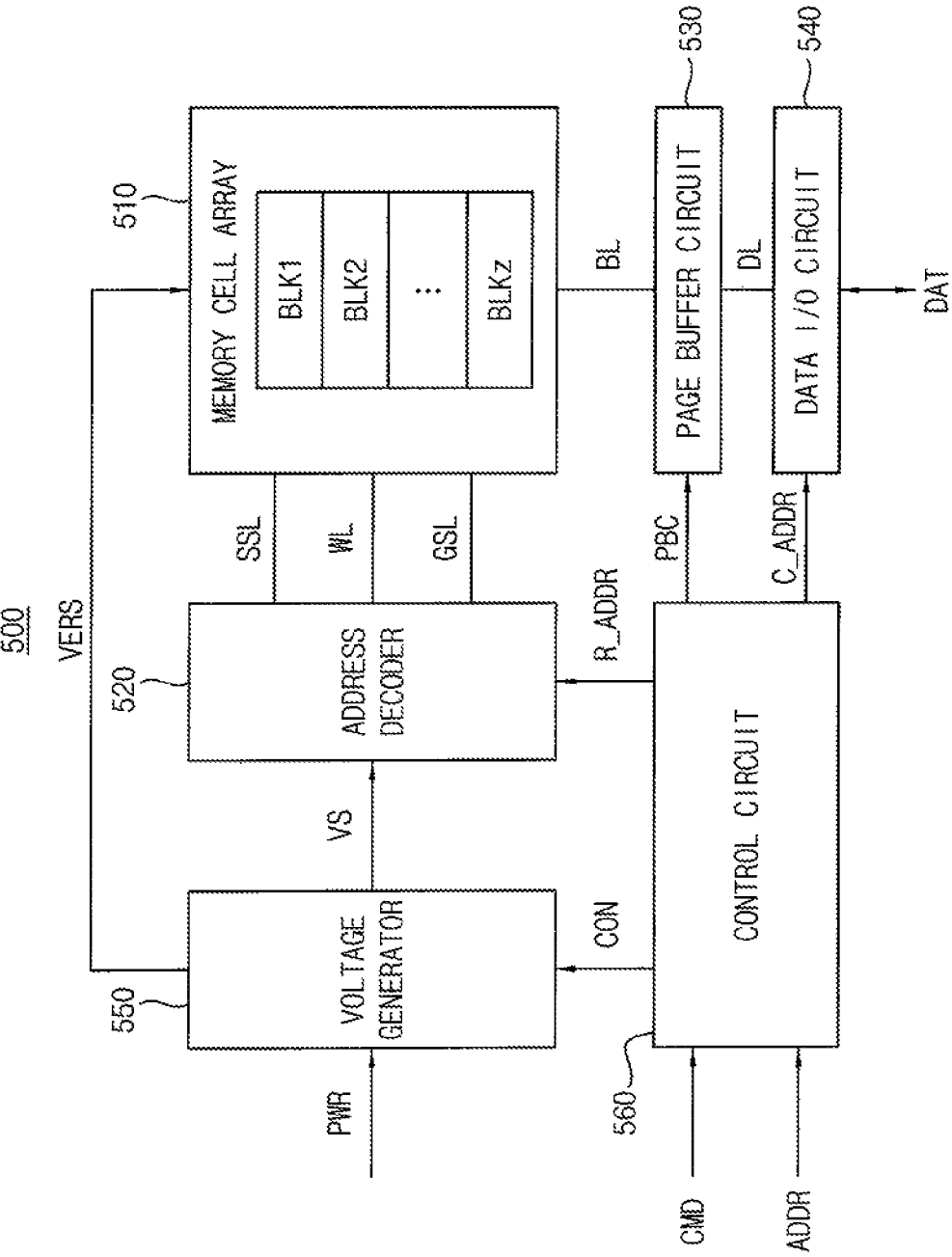
FIG. 5 is a schematic block diagram illustrating an example of a nonvolatile memory included in a storage device according to an exemplary embodiment.

FIG. 5 illustrates an example of a nonvolatile memory included in a storage device according to an exemplary embodiment.

Referring to FIG. 5, a nonvolatile memory 500 includes a memory cell array 510, an address decoder 520, a page buffer circuit 530, a data input/output (I/O) circuit 540, a voltage generator 550 and a control circuit 560.

The memory cell array 510 is connected to the address decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, ..., BLKz each of which includes memory cells. In addition, each of the plurality of memory blocks BLK1, BLK2, ..., BLKz may be divided into a plurality of pages.

In some exemplary embodiments, the plurality of memory cells may be arranged in a two-dimensional (2D) array structure or a three dimensional (3D) vertical array structure. A three-dimensional vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 560 receives a command CMD and an address ADDR from the outside (e.g., the host device 200 and/or the storage controller 310 in FIG. 3), and control erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL.

For example, in the data erase/write/read operations, the address decoder 520 may determine at least one of the plurality of wordlines WL as a selected wordline, and may determine the rest or remainder of the plurality of wordlines WL other than the selected wordline as unselected wordlines, based on the row address R_ADDR.

In addition, in the data erase/write/read operations, the address decoder 520 may determine at least one of the plurality of string selection lines SSL as a selected string selection line, and may determine the rest or remainder of the plurality of string selection lines SSL other than the selected string selection line as unselected string selection lines, based on the row address R_ADDR.

Further, in the data erase/write/read operations, the address decoder 520 may determine at least one of the plurality of ground selection lines GSL as a selected ground selection line, and may determine the rest or remainder of the plurality of ground selection lines GSL other than the selected ground selection line as unselected ground selection lines, based on the row address R_ADDR.

The voltage generator 550 may generate voltages VS that are required for an operation of the nonvolatile memory 500 based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage VERS that is required for the data erase operation based on the power PWR and the control signals CON. The erase voltage VERS may be applied to the memory cell array 510 directly or via the bitline BL.

For example, during the erase operation, the voltage generator 550 may apply the erase voltage VERS to a common source line and/or the bitline BL of a memory block (e.g., a selected memory block) and may apply an erase permission voltage (e.g., a ground voltage) to all wordlines of the memory block or a portion of the wordlines via the address decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the address decoder 520. In addition, during the program verification operation, the voltage generator 550 may apply a program verification voltage to the selected wordline and may apply a verification pass voltage to the unselected wordlines via the address decoder 520.

In addition, during the normal read operation, the voltage generator 550 may apply a read voltage to the selected wordline and may apply a read pass voltage to the unselected wordlines via the address decoder 520. During the data recover read operation, the voltage generator 550 may apply the read voltage to a wordline adjacent to the selected wordline and may apply a recover read voltage to the selected wordline via the address decoder 520.

The page buffer circuit 530 may be connected to the memory cell array 510 via the plurality of bitlines BL. The page buffer circuit 530 may include a plurality of page buffers. In some exemplary embodiments, each page buffer may be connected to one bitline. In other exemplary embodiments, each page buffer may be connected to two or more bitlines.

The page buffer circuit 530 may store data DAT to be programmed into the memory cell array 510 or may read data DAT sensed from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from an outside of the nonvolatile memory 500 to the memory cell array 510 via the page buffer circuit 530 or may provide the data DAT from the memory cell array 510 to the outside of the nonvolatile memory 500, based on the column address C_ADDR.

Figure 6:
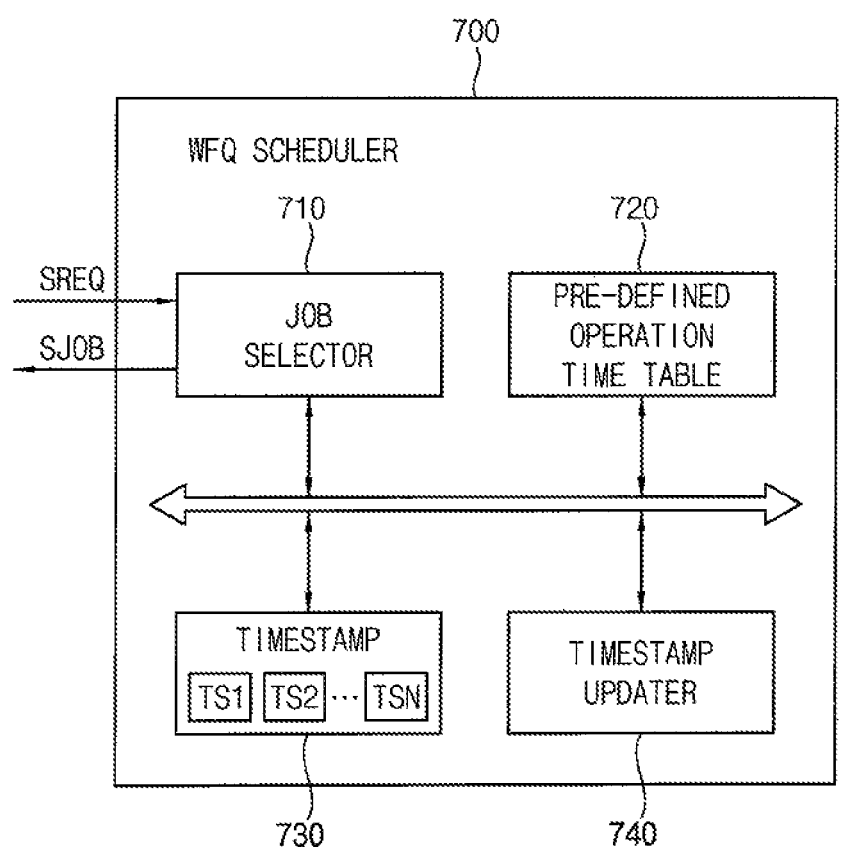
FIG. 6 is a schematic block diagram illustrating an example of a WFQ scheduler included in a storage device according to an exemplary embodiment.
Figures 7, 8:
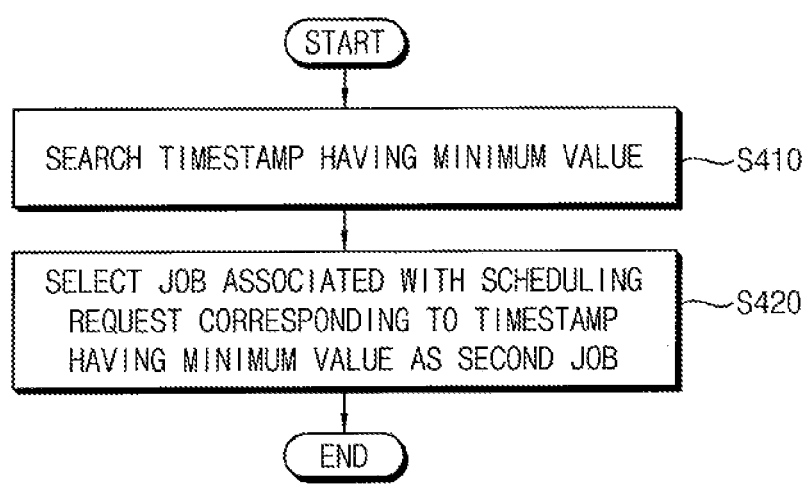
FIG. 7 is a tabular diagram illustrating an example of a pre-defined operation time table included in a WFQ scheduler of FIG. 6.
FIG. 8 is a flowchart diagram illustrating an example of performing a scheduling operation for selecting a second job in FIG. 1.

FIG. 6 illustrates an example of a WFQ scheduler included in a storage device according to an exemplary embodiment. FIG. 7 illustrates an example of a pre-defined operation time table included in a WFQ scheduler of FIG. 6.

Referring to FIGS. 6 and 7, a WFQ scheduler 700 may include a job selector 710, a pre-defined operation time table 720, a timestamp unit 730 and a timestamp updater 740.

The pre-defined operation time table 720 may represent a relationship between a plurality of operations of a storage device (e.g., the storage device 300 in FIG. 3) and operation times. For example, as illustrated in FIG. 7, the pre-defined operation time table 720 may represent a relationship between the plurality of operations and the operation times for each of a plurality of job performers PFMR1, PFMR2, . . . , PFMRN.

In some exemplary embodiments, as described with reference to FIG. 3, the plurality of job performers PFMR1 to PFMRN may include the plurality of applications APP1 to APPN that are different from each other. In other exemplary embodiments, as will be described with reference to FIG. 18, the plurality of job performers PFMR1 to PFMRN may include a plurality of host devices that are different from each other. The plurality of job performers PFMR1 to PFMRN may be referred to as a plurality of users.

In some exemplary embodiments, the plurality of operations of the storage device 300 may include a data read operation RDO, a data write operation WRO and a data erase operation ERO on the storage device 300. However, exemplary embodiments are not limited thereto. For example, the plurality of operations of the storage device 300 may include not only one data read/write/erase operations but also a plurality of data read/write/erase operations performed in different schemes, and may further include at least one of various operations of the storage device 300.

In some exemplary embodiments, operation times (e.g., data reading times) TR1, TR2, . . . , TRN associated with the data read operation RDO, operation times (e.g., data writing times) TW1, TW2, . . . , TWN associated with the data write operation WRO, and operation times (e.g., data erasing times) TE1, TE2, . . . , TEN associated with the data erase operation ERO may be pre-defined and pre-stored for the plurality of job performers PFMR1 to PFMRN. For example, it may be pre-defined and predicted that the operation time TR1 is required for the job performer PFMR1 to perform the data read operation RDO, the operation time TW1 is required for the job performer PFMR1 to perform the data write operation WRO, and the operation time TE1 is required for the job performer PFMR1 to perform the data erase operation ERO.

The above-described pre-defined operation times TR1 to TRN, TW1 to TWN and TE1 to TEN may not be recorded by measuring an actual execution time of each operation in real time, and may be recorded by predicting a time that is expected to be required when each operation is performed. The pre-defined operation times TR1 to TRN, TW1 to TWN and TE1 to TEN may be referred to as normalized operation times.

In some exemplary embodiments, the operation times TR1 to TRN and TW1 to TWN may represent time required to read and write the minimum unit (e.g., one page) of the data read and write operation RDO and WRO, and the operation times TE1 to TEN may represent time required to erase the minimum unit (e.g., one memory block) of the data erase operation ERO.

In some exemplary embodiments, different weights WT1, WT2, . . . , WTN may be assigned or allocated to the plurality of job performers PFMR1 to PFMRN. The pre-defined operation times TR1 to TRN, TW1 to TWN and TE1 to TEN may be set differently for the plurality of job performers PFMR1 to PFMRN based on the different weights WT1 to WTN. For example, the operation times TR1 to TRN associated with the same data read operation RDO may be different for each of the plurality of job performers PFMR1 to PFMRN, the operation times TW1 to TWN associated with the same data write operation WRO may be different for each of the plurality of job performers PFMR1 to PFMRN, and the operation times TE1 to TEN associated with the same data erase operation ERO may be different for each of the plurality of job performers PFMR1 to PFMRN. In other words, the pre-defined operation times TR1 to TRN, TW1 to TWN and TE1 to TEN may be values in which the different weights WT1 to WTN are reflected. For example, the pre-defined operation time may have a value obtained by dividing the actual execution time by the weight.

In some exemplary embodiments, the weights WT1 to WTN and the operation times TR1 to TRN, TW1 to TWN and TE1 to TEN may be predetermined and stored at a time of manufacturing the storage device 300. According to exemplary embodiments, the weights WT1 to WTN and the operation times TR1 to TRN, TW1 to TWN and TE1 to TEN may have fixed values, or may be updated in real time by reflecting a monitoring result performed while driving the storage device 300.

The job selector 710 may receive a plurality of scheduling requests SREQ for selecting a job SJOB to be performed subsequently, and may select the job SJOB to be performed subsequently based on the plurality of scheduling requests SREQ and a plurality of timestamps TS1, TS2, . . . , TSN included in the timestamp unit 730 to output the selected job SJOB. In other words, the job selector 710 may perform steps S300 and S400 in FIG. 1. For example, the job selector 710 may perform a scheduling operation for selecting the job SJOB to be performed subsequently after a current job is started and before the current job is completed. For example, the above-described scheduling operation may be performed when the plurality of scheduling requests SREQ are received from two or more of the plurality of job performers PFMR1 to PFMRN.

The timestamp unit 730 may include the plurality of timestamps TS1 to TSN corresponding to a plurality of job performers PFMR1 to PFMRN. The plurality of timestamps TS1 to TSN may represent accumulated times in which the plurality of job performers PFMR1 to PFMRN have used the storage device 300 cumulatively. In this example, a value of each of the plurality of timestamps TS1 to TSN may continue to increase over time. For example, the timestamp TS1 may correspond to the job performer PFMR1, and may represent the accumulated time in which the job performer PFMR1 have used the storage device 300 cumulatively. For example, the number of the plurality of timestamps TS1 to TSN may be substantially the same as the number of the plurality of job performers PFMR1 to PFMRN.

The timestamp updater 740 may update a timestamp for the current job among the plurality of timestamps TS1 to TSN based on the pre-defined operation time table 720. In other words, the timestamp updater 740 may perform step S200 in FIG. 1. For example, the timestamp updater 740 may perform a timestamp update operation after the current job is started and before the current job is completed.

Figure 9:
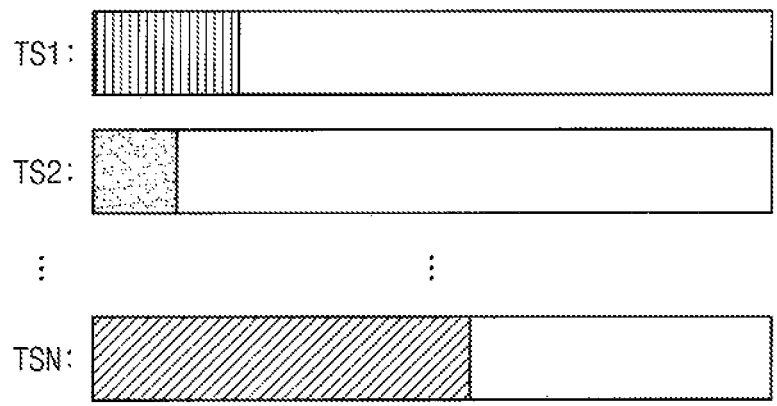
FIG. 9 is a hybrid timing diagram for describing a scheduling operation of FIG. 8.

FIG. 8 illustrates an example of performing a scheduling operation for selecting a second job in FIG. 1. FIG. 9 illustrates a scheduling operation of FIG. 8.

Referring to FIGS. 1, 2, 6, 7, 8 and 9, when performing the scheduling operation WSC2 for selecting the second job JOB2 based on the plurality of scheduling requests SREQ and the plurality of timestamps TS1 to TSN while the first job JOB1 is performed (step S400), a timestamp having the minimum (or smallest) value may be searched by comparing the plurality of timestamps TS1 to TSN with each other (step S410). For example, the plurality of timestamps TS1 to TSN may be formed as illustrated in FIG. 9. In the example of FIG. 9, hatched areas (or regions) may represent values (e.g., accumulated times) of the plurality of timestamps TS1 to TSN, and the timestamp TS2 having the minimum value may be selected based on the values.

A job associated with a scheduling request corresponding to the timestamp TS2 having the minimum value among the plurality of scheduling requests SREQ may be selected as the second job JOB2 (step S420).

In some exemplary embodiments, the first job JOB1 may be a job corresponding to the timestamp TS1, e.g., a job associated with a scheduling request from the job performer PFMR1, and the second job JOB2 may be a job corresponding to the timestamp TS2, e.g., a job associated with a scheduling request from the job performer PFMR2. In other words, the timestamp TS1 for the first job JOB1 and the timestamp TS2 for the second job JOB2 may be different from each other.

In other exemplary embodiments, if there is no scheduling request corresponding to the timestamp TS2, e.g., if a scheduling request is not received from the job performer PFMR2 corresponding to the timestamp TS2 among the plurality of scheduling requests SREQ, a job associated with a scheduling request corresponding to the timestamp TS1 having the second minimum value may be selected as the second job JOB2. In this example, both the first job JOB1 and the second job JOB2 may be a job corresponding to the timestamp TS1, e.g., a job associated with a scheduling request from the job performer PFMR1. In other words, the timestamp TS1 for the first job JOB1 and the timestamp TS1 for the second job JOB2 may be substantially the same as each other.

In some exemplary embodiments, steps S410 and S420 in FIG. 8 may be performed by the job selector 710 in FIG. 7. Thus, the job selector 710 may be referred to as a minimum value searcher or a minimum value selector for searching or selecting the timestamp having the minimum value.

Figure 10:
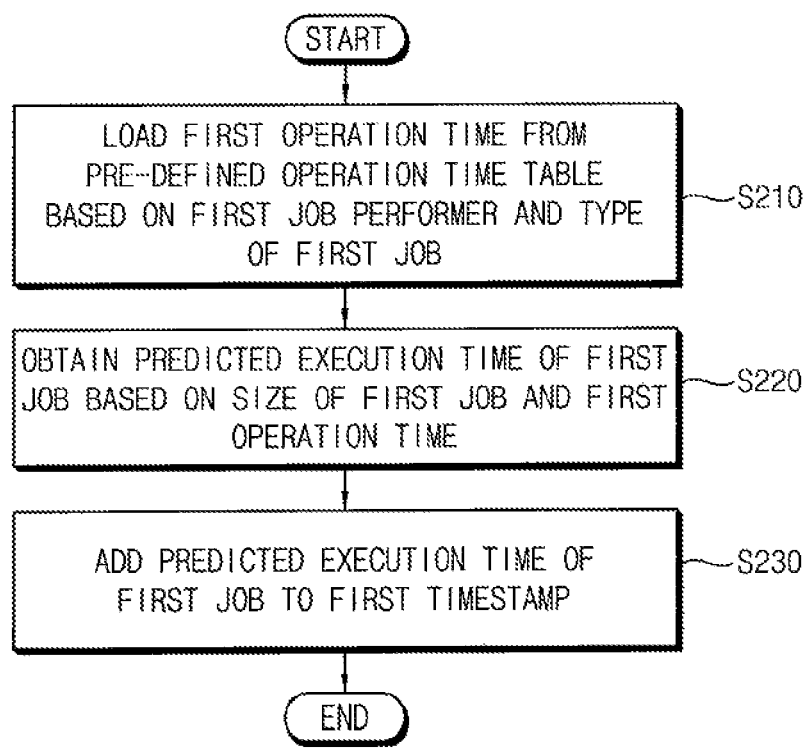
FIG. 10 is a flowchart diagram illustrating an example of updating a first timestamp in FIG. 1.
Figure 11:
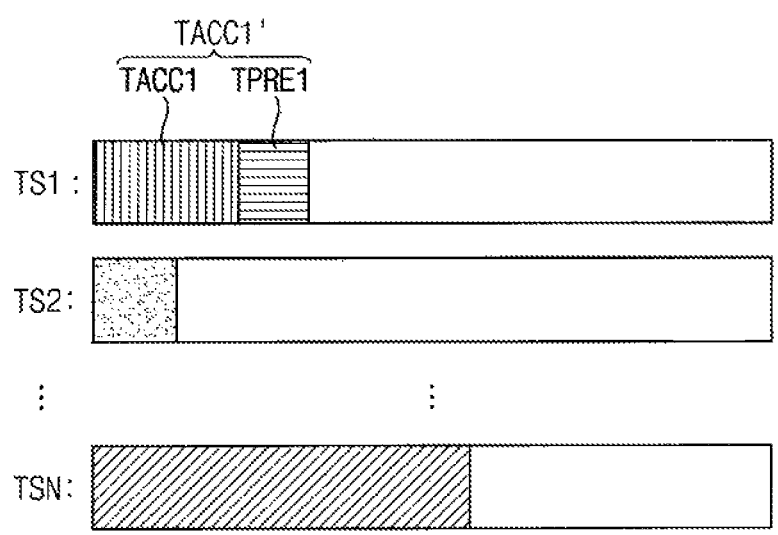
FIG. 11 is a hybrid timing diagram for describing an update operation of FIG. 10.

FIG. 10 illustrates an example of updating a first timestamp in FIG. 1. FIG. 11 illustrates an update operation of FIG. 10.

Referring to FIGS. 1, 2, 6, 7, 10 and 11, when updating the first timestamp for the first job JOB1 among the plurality of timestamps TS1 to TSN based on the pre-defined operation time table 720 (step S200), a first operation time may be loaded from the pre-defined operation time table 720 based on a first job performer of the first job JOB1 among the plurality of job performers PFMR1 to PFMRN and a type of the first job JOB1 (step S210).

For example, when the first job JOB1 is a job corresponding to the timestamp TS1, e.g., a job associated with a scheduling request from the job performer PFMR1, the first job performer and the first timestamp may be the job performer PFMR1 and the timestamp TS1, respectively. In addition, when the first job JOB1 includes the data read operation RDO, the operation time TR1 in the pre-defined operation time table 720 may be loaded as the first operation time.

A predicted execution time of the first job JOB1 may be obtained based on a size of the first job JOB1 and the first operation time (step S220), and the predicted execution time of the first job JOB1 may be added to the first timestamp (step S230).

For example, as described above, the operation time TR1 may represent a time required to read the minimum unit of the data read operation RDO. For example, when the minimum unit of the data read operation RDO is about 4 KB and when a size of data read by the first job JOB1 is about 16 KB, a predicted execution time TPRE1 of the first job JOB1 may be about 4*TR1. The timestamp TS1 may be updated to have a new accumulated time TACC1' by adding the predicted execution time TPRE1 of the first job JOB1 to a current accumulated time TACC1 of the timestamp TS1.

As described above, the operation time TR1 included in the pre-defined operation time table 720 may not be an actual execution time but may be a predicted execution time, the timestamp TS1 may be pre-updated (or updated in advance) based on the operation time TR1 while the first job JOB1 is performed (e.g., before the first job JOB1 is completed), and thus the timestamp TS1 may not correspond to an actual accumulated time in which the job performer PFMR1 have actually used the storage device 300 cumulatively but may correspond to a virtual accumulated time in which the job performer PFMR1 is expected to use the storage device 300 cumulatively. Similarly, the plurality of timestamps TS1 to TSN may represent virtual accumulated times in which the plurality of job performers PFMR1 to PFMRN are expected to use the storage device 300 cumulatively. Thus, the plurality of timestamps TS1 to TSN may be referred to as virtual timestamps.

In some exemplary embodiments, steps S210, S220 and S230 in FIG. 10 may be performed by the timestamp updater 740 in FIG. 7.

Figure 12:
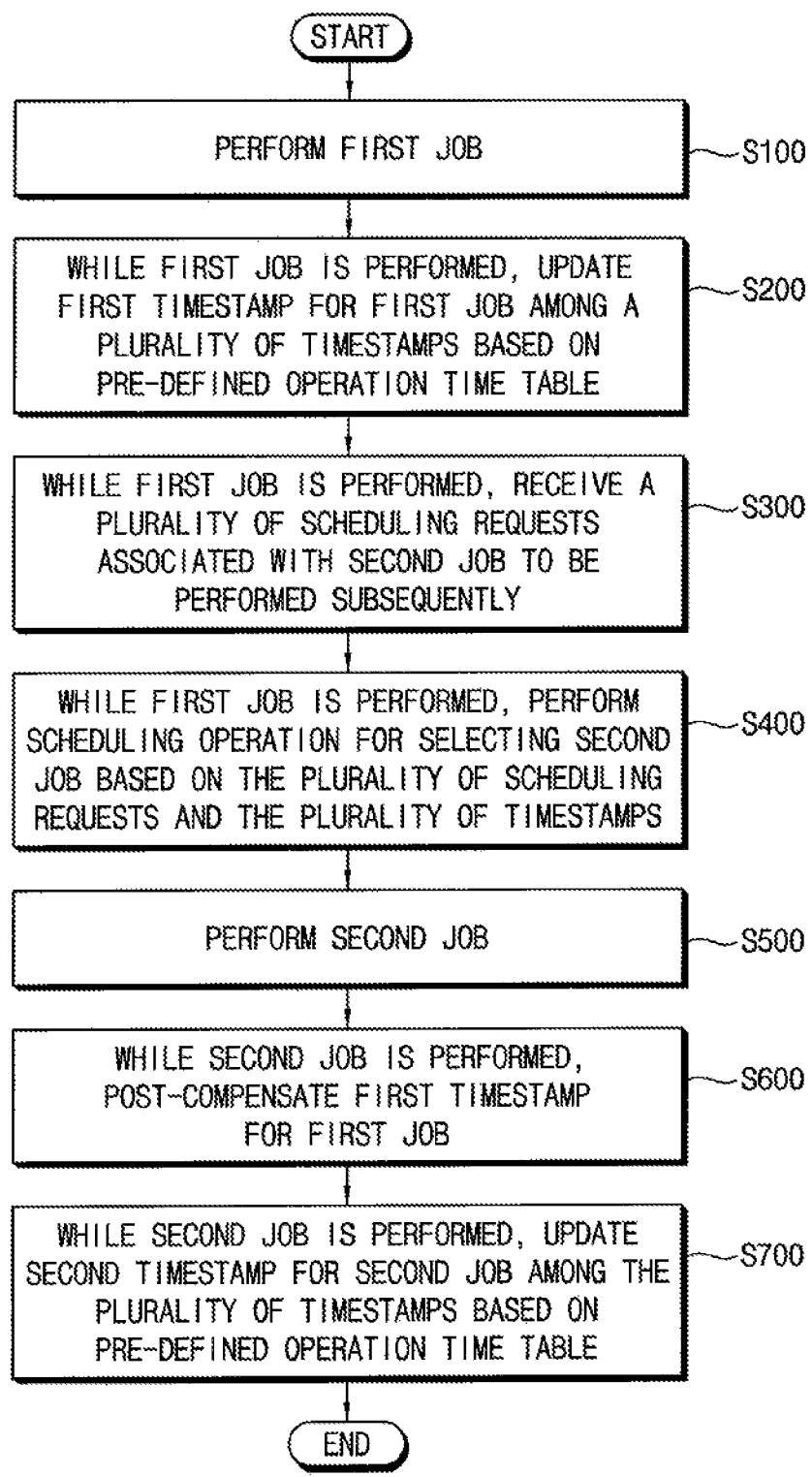
FIG. 12 is a flowchart diagram illustrating a method of scheduling jobs in a storage device using a pre-defined time according to an exemplary embodiment.
Figure 13:
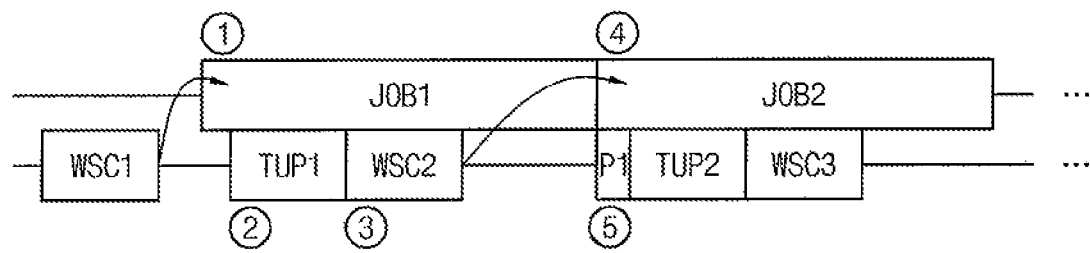
FIG. 13 is a hybrid timing diagram for describing a method of scheduling jobs in a storage device of FIG. 12.

FIG. 12 illustrates a method of scheduling jobs in a storage device using a pre-defined time according to an exemplary embodiment. FIG. 13 illustrates a method of scheduling jobs in a storage device of FIG. 12. The descriptions repeated with FIGS. 1 and 2 will be omitted.

Referring to FIGS. 12 and 13, in a method of scheduling jobs in a storage device according to exemplary embodiments, steps S100, S200, S300 and S400 in FIG. 12 may be substantially the same as steps S100, S200, S300 and S400 in FIG. 1, respectively.

After the first job JOB1 is completed, the second job JOB2 selected by the scheduling operation in step S400 is performed (step S500). An operation ④ in FIG. 13 may indicate step S500 in FIG. 12. As described above, the time for updating the timestamp of the current job and the time for scheduling the next job may not be required between the current job and the next job, and thus the second job JOB2 may be started immediately after the first job JOB1 is completed.

While the second job JOB2 is performed, the first timestamp for the first job JOB1 may be post-compensated (step S600). An operation ⑤ in FIG. 13 may indicate an operation P1 of post-compensating the first timestamp in step S600 of FIG. 12. As described above, the operation TUP1 of updating the first timestamp in step S200 may be pre-performed (or performed in advance) based on the predicted execution time, not based on the actual execution time, and occasionally, an error may exist between the predicted execution time and the actual execution time. In this example, the first timestamp may be post-compensated to reflect the error.

While the second job JOB2 is performed, a second timestamp for the second job JOB2 among the plurality of timestamps may be updated based on the pre-defined operation time table (step S700). Step S700 may be substantially the same as step S200, except that a target of an update operation is changed.

In some exemplary embodiments, while the second job JOB2 is performed, the operation P1 of post-compensating the first timestamp may be performed first, and then the operation TUP2 of updating the second timestamp may be performed later. For example, the operation P1 of post-compensating the first timestamp may be started substantially simultaneously with the second job JOB2, and the operation TUP2 of updating the second timestamp may be started immediately after the operation P1 of post-compensating the first timestamp is completed.

After step S700, operations similar to steps S300 and S400 may be further performed. For example, while the second job JOB2 is performed, a plurality of scheduling requests associated with a third job to be performed subsequently may be received, and while the second job JOB2 is performed, a scheduling operation WSC3 for selecting the third job may be performed based on the plurality of scheduling requests and the plurality of timestamps.

In the method of scheduling jobs in the storage device according to exemplary embodiments, the timestamp update operation for the current job and the scheduling operation for the next job may overlap with the execution of the current job, and thus the latency overhead may be reduced and the scheduling performance of the storage device may be improved. In addition, the timestamp of the current job may be post-compensated based on the actual execution time of the current job after the current job is completed, and thus the accuracy of the scheduling operation can be improved.

Figure 14:
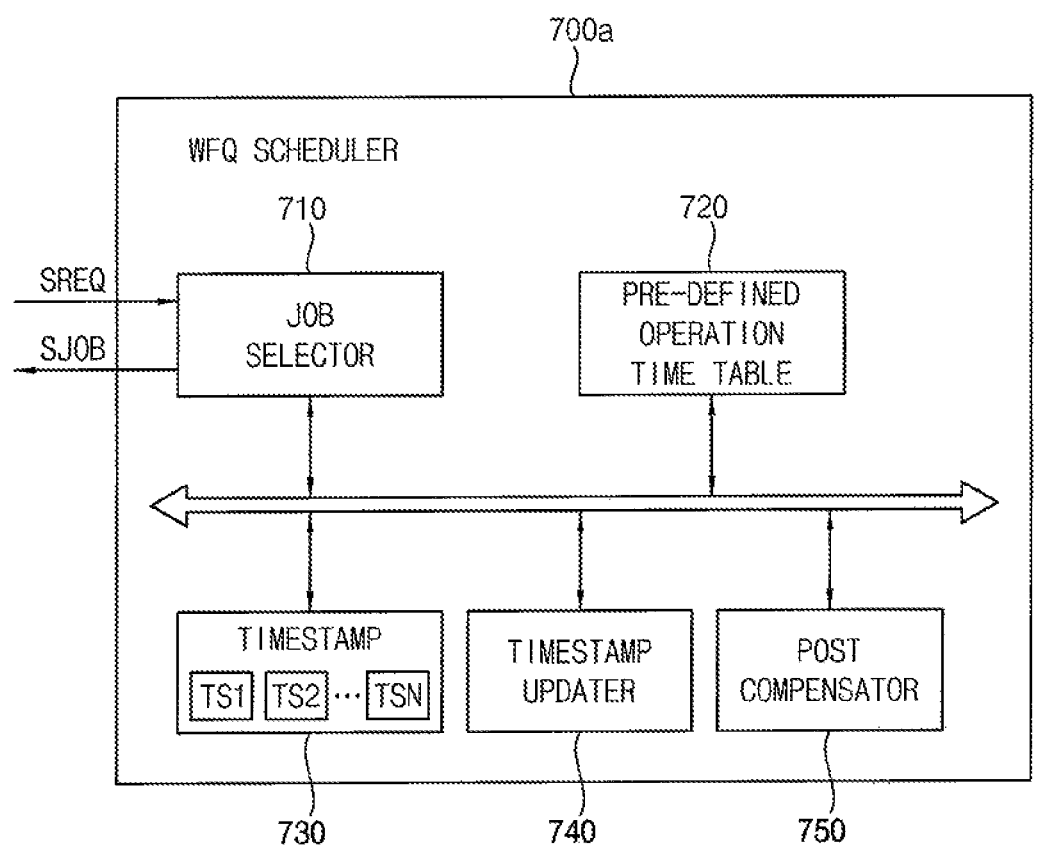
FIG. 14 is a schematic block diagram illustrating another example of a WFQ scheduler included in a storage device according to an exemplary embodiment.

FIG. 14 illustrates another example of a WFQ scheduler included in a storage device according to an exemplary embodiment. The descriptions repeated with FIG. 6 will be omitted.

Referring to FIG. 14, a WFQ scheduler 700a may include a job selector 710, a pre-defined operation time table 720, a timestamp unit 730, a timestamp updater 740 and a post-compensator 750.

The WFQ scheduler 700a of FIG. 14 may be substantially the same as the WFQ scheduler 700 of FIG. 6, except that the WFQ scheduler 700a further includes the post-compensator 750.

The post-compensator 750 may post-compensate on the timestamp for the current job among the plurality of timestamps TS1 to TSN based on a result of performing the current job. In other words, the post-compensator 750 may perform step S600 in FIG. 12. For example, the post-compensator 750 may perform the post-compensation after the current job is completed.

Figure 15:
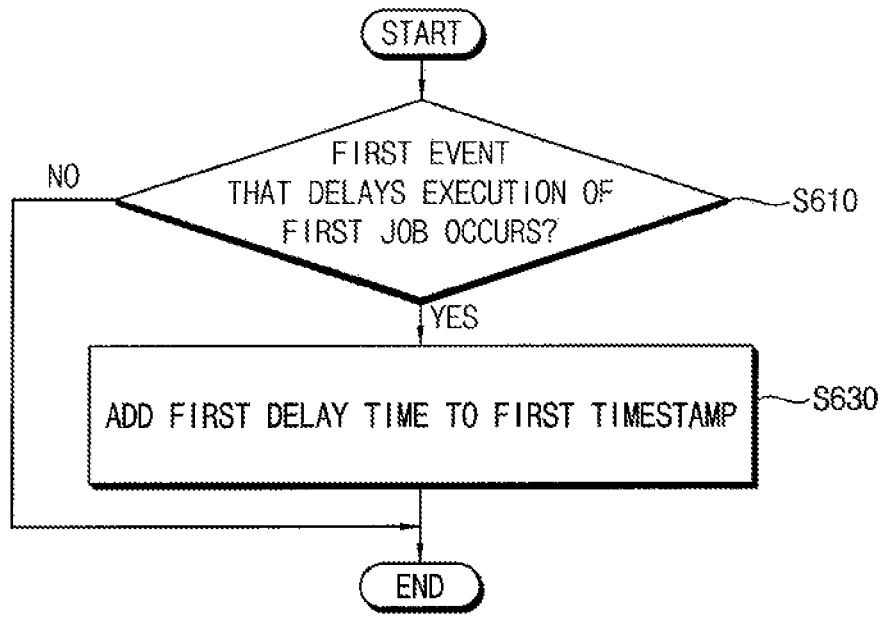
FIG. 15 is a flowchart diagram illustrating an example of post-compensating a first timestamp in FIG. 12.
Figure 16:
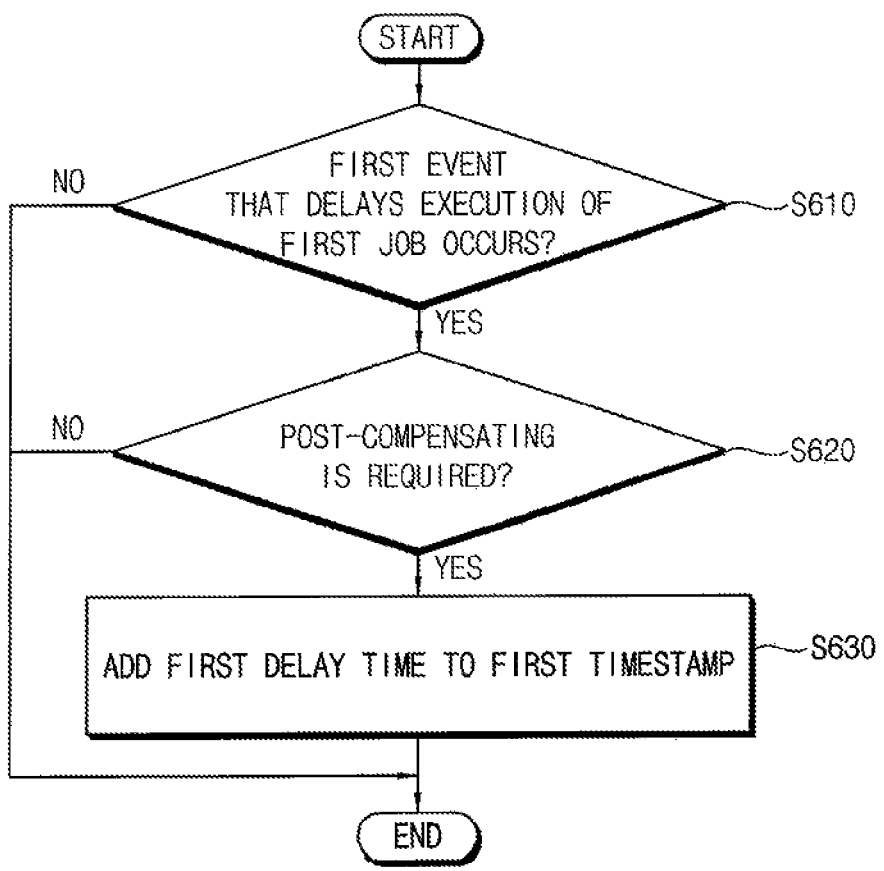
FIG. 16 is a flowchart diagram illustrating another example of post-compensating a first timestamp in FIG. 12.

FIGS. 15 and 16 illustrate examples of post-compensating a first timestamp in FIG. 12.

Referring to FIGS. 12, 13 and 15, when post-compensating the first timestamp for the first job JOB1 while the second job JOB2 is performed (step S600), it may be checked whether a first event that delays an execution of the first job JOB1 occurs during the execution of the first job JOB1 (step S610). For example, the first event may be an event that occurs dynamically, such as the first job JOB1 is forcibly suspended by a request from the host device 200 during the execution of the first job JOB1.

When the first event occurs (step S610: YES), a first delay time may be added to the first timestamp (step S630). The first delay time may represent a time interval in which the execution of the first job JOB1 is delayed by the first event. When the first event does not occur (step S610: NO), the post-compensation process may be terminated without additional action.

Referring to FIGS. 12, 13 and 16, when post-compensating the first timestamp for the first job JOB1 while the second job JOB2 is performed (step S600), step S610 in FIG. 16 may be substantially the same as step S610 in FIG. 15.

When the first event occurs (step S610: YES), it may be determined whether the first event is an event in which the post-compensating or post-compensation is required (step S620).

When the first event occurs (step S610: YES) and when the first event is the event in which the post-compensating is required (step S620: YES), the first delay time may be added to the first timestamp (step S630). Step S630 in FIG. 16 may be substantially the same as step S630 in FIG. 15.

When the first event does not occur (step S610: NO), or when the first event occurs (step S610: YES) and when the first event is not the event in which the post-compensating is required (step S620: NO), the post-compensation process may be terminated without additional action. For example, when an error due to the first delay time is smaller than a threshold value and a disadvantage (e.g., resource use and/or consumption) by the post-compensating is greater than an advantage (e.g., accuracy improvement) by the post-compensating, it may be determined that the post-compensating is not required.

Figure 17:
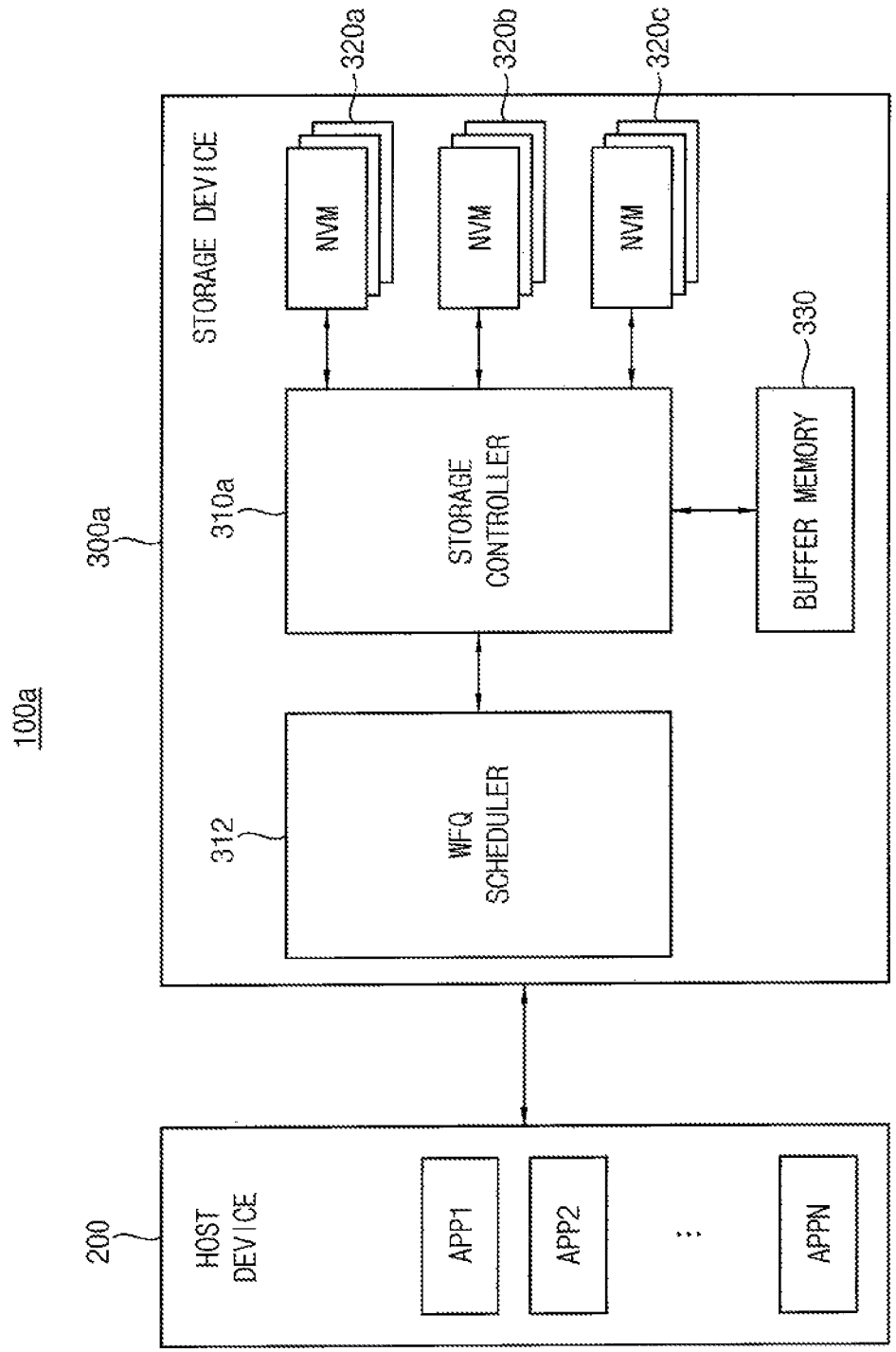
FIG. 17 is a schematic block diagram illustrating a storage system including a storage device according to an exemplary embodiment.
Figure 18:
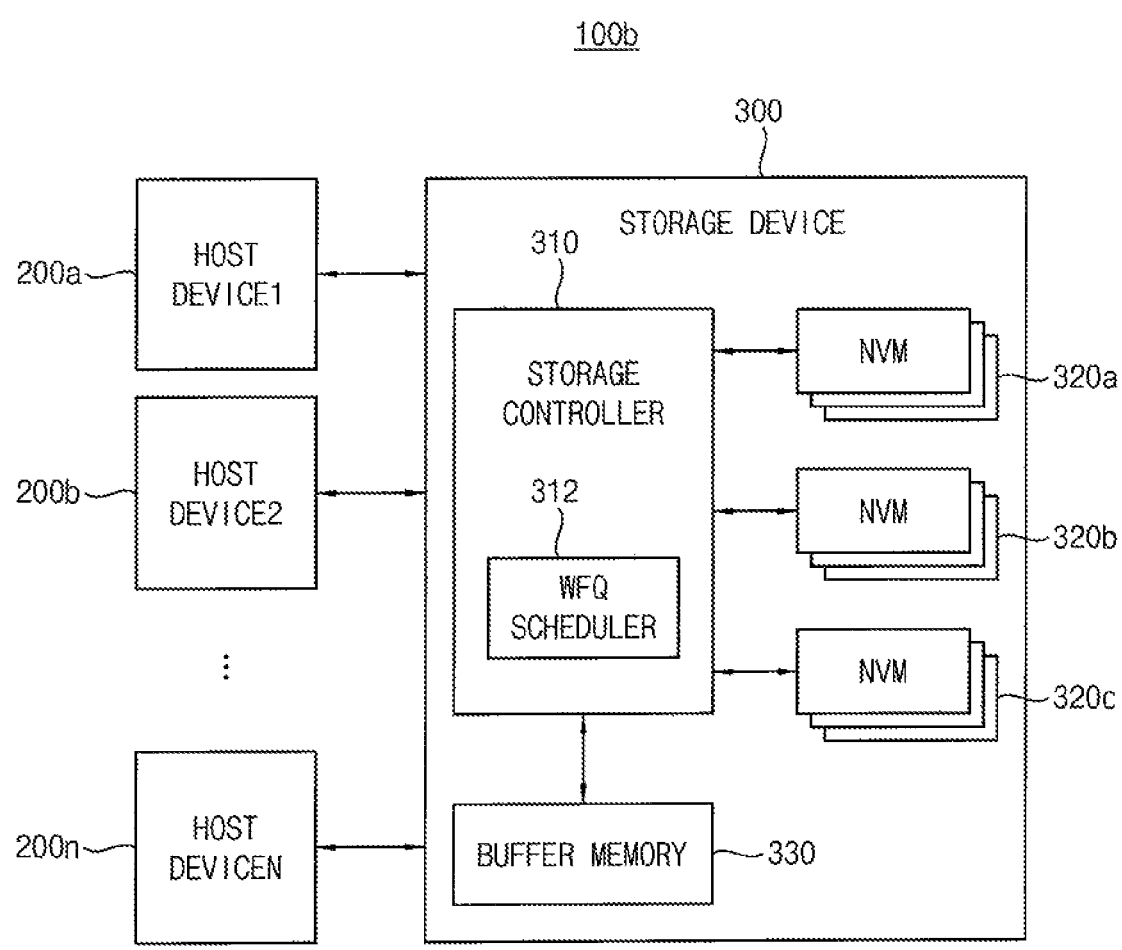
FIG. 18 is a schematic block diagram illustrating a storage system including a storage device according to an exemplary embodiment.

FIGS. 17 and 18 illustrate a storage device and a storage system including the storage device according to exemplary embodiments. The descriptions repeated with FIG. 3 will be omitted.

Referring to FIG. 17, a storage system 100a includes a host device 200 and a storage device 300a.

The storage system 100a of FIG. 17 may be substantially the same as the storage system 100 of FIG. 3, except that the WFQ scheduler 312 included in the storage device 300a is located outside a storage controller 310a.

Referring to FIG. 18, a storage system 100b includes a plurality of host devices 200a, 200b, . . . , 200n and a storage device 300.

The storage system 100b of FIG. 18 may be substantially the same as the storage system 100 of FIG. 3, except that the storage system 100b includes the plurality of host devices 200a to 200n.

The storage device 300 is accessed by each of the plurality of host devices 200a to 200n. The plurality of host devices 200a to 200n may generate a plurality of jobs and a plurality of scheduling requests for using or accessing the storage device 300 (e.g., for writing, reading and/or erasing data, or the like). In other words, the plurality of job performers, which are subjects or parties performing the plurality of jobs described with reference to FIG. 1, may include the plurality of host devices 200a to 200n.

According to exemplary embodiments, each of the plurality of host devices 200a to 200n may execute a plurality of applications as described with reference to FIG. 3, and/or the WFQ scheduler 312 included in the storage device 300 may be located outside the storage controller 310 as described with reference to FIG. 17.

Although the methods of scheduling jobs in the storage device or the methods of operating the storage device according to exemplary embodiments are described with reference to FIGS. 1 through 18, exemplary embodiments may be described as a method of operating a storage system including a host device and a storage device. In this example, steps S100, S200, S400, S500, S600 and S700 in FIGS. 1 and 12 may be described as being performed by the storage device, and step S300 in FIGS. 1 and 12 may be described as the host device transmitting the plurality of scheduling requests to the storage device.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general-purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 19:
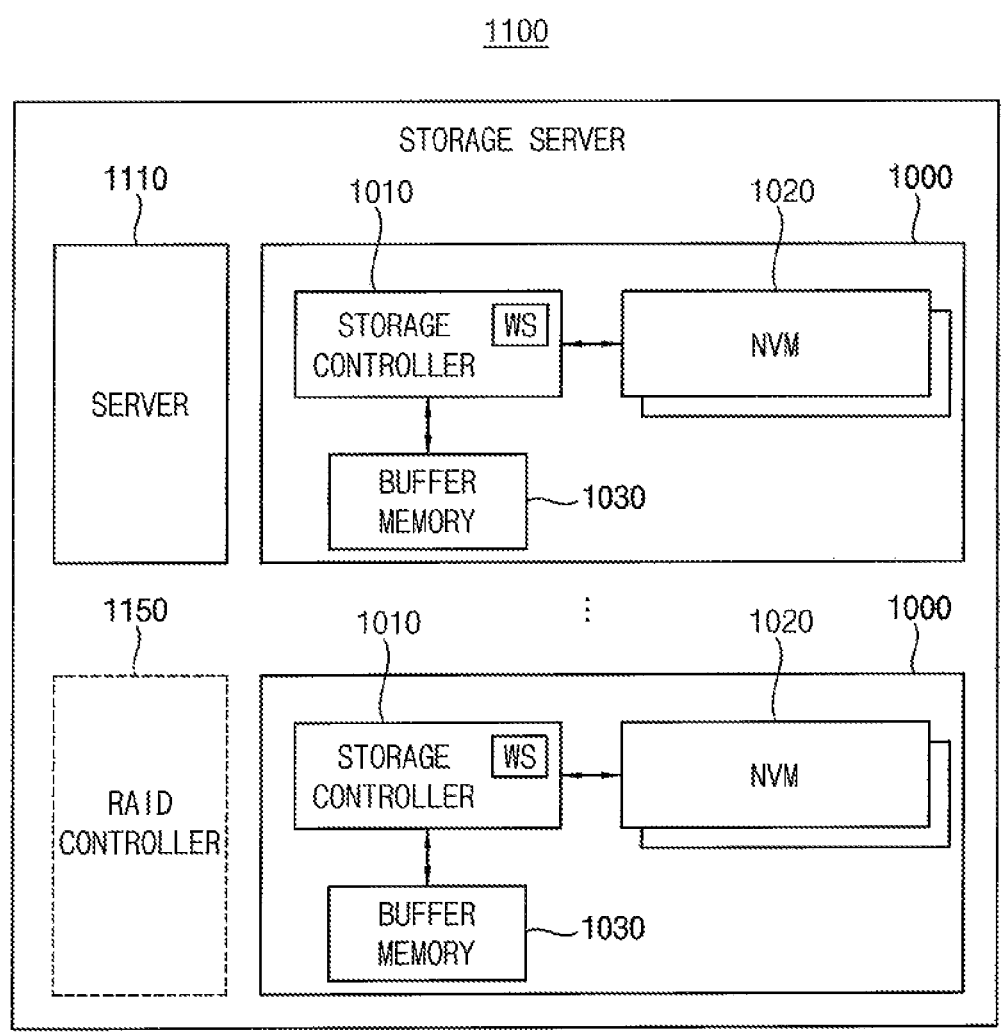
FIG. 19 is a schematic block diagram illustrating a storage server including a plurality of storage devices according to an exemplary embodiment.

FIG. 19 illustrates a storage server including a storage device according to an exemplary embodiment.

Referring to FIG. 19, a storage server 1100 may include a server 1110, a plurality of storage devices 1000 which store data for operating the server 1110, and a redundant array of independent drives (RAID) controller 1150 for controlling the plurality of storage devices 1000.

The RAID techniques are mainly used in data servers where important data can be replicated in more than one location across a plurality a plurality of storage devices. The RAID controller 1150 may enable one of a plurality of RAID levels according to RAID information, and may interfacing data between the server 1110 and the plurality of storage devices 1000.

Each of the plurality of storage devices 1000 may include a storage controller 1010 including a WFQ scheduler WS, a plurality of nonvolatile memories 1020 and a buffer memory 1030. Each of the plurality of storage devices 1000 may correspond to the storage device 300 according to exemplary embodiments, and may operate according to exemplary embodiments described above with reference to FIGS. 1 through 18. The server 1110 may correspond to the host device 200, and may control the plurality of storage devices 1000.

The RAID controller 1150 may also include a WFQ scheduler according to an exemplary embodiment.

The inventive concept may be applied to various electronic devices and/or systems including storage devices and/or storage systems. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, or the like The foregoing is illustrative of exemplary embodiments and is not to be construed as limiting thereof. Although some exemplary embodiments have been described, those of ordinary skill in the pertinent art may readily appreciate that many modifications are possible in the exemplary embodiments without materially departing from the novel teachings and advantages of the present disclosure. Accordingly, all such modifications are intended to be included within the scope of the inventive concept as defined in the appended claims. Therefore, it is to be understood that the foregoing is illustrative and is not to be construed as limited to the specific exemplary embodiments disclosed, and that modifications to the disclosed exemplary embodiments, as well as to other embodiments, are intended to be included within the scope and spirit of the appended claims.

What is claimed is:

1. A method of scheduling jobs in a storage device, the method comprising:
   pre-defining an operation time table that represents a relationship between a plurality of operations of the storage device and expected operation times thereof;
   receiving a plurality of scheduling requests associated with a plurality of timestamps for a plurality of jobs each having at least one operation;
   performing a first job from the plurality of jobs having a first operation;

while the first job is being performed, pre-updating a first timestamp for the first job based on the first operation and the pre-defined operation time table; and while the first job is being performed, pre-performing a scheduling operation for selecting a second job from the plurality of jobs to be performed subsequent to the first job based on the plurality of scheduling requests and the plurality of timestamps, wherein, while the second job is performed, an operation of post-compensating the first timestamp is performed first, and then an operation of pre-updating a second timestamp for the second job is performed later.

2. The method of claim 1, wherein:

the plurality of timestamps correspond to a plurality of job performers, different weights are assigned to the plurality of job performers, and the operation times of the plurality of operations of the storage device that are included in the pre-defined operation time table are set differently for the plurality of job performers based on the different weights.

3. The method of claim 2, wherein the plurality of timestamps represent accumulated times in which the plurality of job performers have used the storage device cumulatively.

4. The method of claim 3, wherein as the first timestamp is pre-updated while the first job is performed, the plurality of timestamps represent virtual accumulated times in which the plurality of job performers are expected to use the storage device cumulatively.

5. The method of claim 2, wherein pre-updating the first timestamp for the first job includes:

loading a first operation time from the pre-defined operation time table based on a first job performer of the first job among the plurality of job performers and a type of the first job;

obtaining a predicted execution time of the first job based on a size of the first job and the first operation time; and adding the predicted execution time of the first job to the first timestamp.

6. The method of claim 2, wherein the plurality of job performers are a plurality of applications that are different from each other and executed by a storage system including the storage device.

7. The method of claim 2, wherein the plurality of job performers are a plurality of host devices that are different from each other and allow to access the storage device.

8. The method of claim 1, wherein the plurality of operations of the storage device include a data read operation, a data write operation and a data erase operation on the storage device.

9. The method of claim 1, wherein pre-performing the scheduling operation for selecting the second job includes:

searching the second timestamp having a minimum value by comparing the plurality of timestamps with each other; and selecting a job associated with a scheduling request corresponding to the second timestamp among the plurality of scheduling requests as the second job, wherein the first timestamp and the second timestamp are the same as each other.

10. The method of claim 1, further comprising:

after the first job is completed, performing the second job selected by the scheduling operation.

11. The method of claim 10, further comprising:

while the second job is performed, post-compensating the first timestamp for the first job.

12. The method of claim 11, wherein post-compensating the first timestamp for the first job includes:

checking whether a first event that delays an execution of the first job occurs during the execution of the first job; and when the first event occurs, adding a first delay time to the first timestamp, the first delay time representing a time interval in which the execution of the first job is delayed by the first event.

13. The method of claim 12, wherein post-compensating the first timestamp for the first job further includes:

when the first event occurs, determining whether the first event is an event in which post-compensating is required, and the first delay time is added to the first timestamp when the first event occurs and when the first event is the event in which the post-compensating is required.

14. The method of claim 11, further comprising:

while the second job is performed, pre-updating the second timestamp for the second job among the plurality of timestamps based on the pre-defined operation time table.

15. The method of claim 1, further comprising:

performing a first scheduling operation for selecting the first job from the plurality of jobs based on a plurality of first scheduling requests and a plurality of first timestamps;

while the first job is being performed, receiving a plurality of second scheduling requests and a plurality of second timestamps associated with a second job to be performed subsequent to the first job;

while the first job is being performed, performing a second scheduling operation for selecting the second job based on the plurality of second scheduling requests and the plurality of second timestamps;

immediately after the first job is completed, performing the second job selected by the second scheduling operation;

while the second job is being performed, post-compensating the first timestamp for the first job; and while the second job is being performed and after the first timestamp is post-compensated, updating the second timestamp for the second job among the plurality of second timestamps based on the pre-defined operation time table, wherein each plurality of timestamps corresponds to a plurality of job performers to which different weights are assigned, and wherein the operation times of the plurality of operations of the storage device that are included in the pre-defined operation time table are set differently for the plurality of job performers based on the different weights.

16. A method of operating a storage system that includes at least one host device and a storage device, the method comprising:

performing, by the storage device, a first job;

while the first job is being performed, pre-updating, by the storage device, a first completion timestamp for the first job among a plurality of timestamps based on a pre-defined operation time table that is stored in the storage device and represents a relationship between a plurality of operations of the storage device and predicted operation times thereof;

while the first job is being performed by the storage device, transmitting, by the at least one host device, a plurality of scheduling requests to the storage device, the plurality of scheduling requests being associated with a second job to be performed subsequent to the first job by the storage device; and while the first job is being performed, pre-performing, by the storage device, a scheduling operation for selecting the second job based on the plurality of scheduling requests and the plurality of timestamps, wherein, while the second job is performed, an operation of post-compensating the first completion timestamp is performed first, and then an operation of pre-updating a second completion timestamp for the second job is performed later.

17. A storage device comprising:

a storage controller connected to at least one non-volatile memory; and a scheduler connected to the storage controller, wherein the scheduler is configured for receiving a plurality of scheduling requests associated with a plurality of timestamps for a plurality of jobs each having at least one operation with respect to the at least one non-volatile memory, wherein the storage controller is configured for performing a first job from the plurality of jobs having a first operation with respect to the at least one non-volatile memory, wherein the scheduler is further configured for pre-updating a first timestamp for the first job based on the first operation and a pre-defined operation time table, while the first job is being performed, wherein the scheduler is further configured for pre-performing a scheduling operation for selecting a second job from the plurality of jobs to be performed subsequent to the first job based on the plurality of scheduling requests and the plurality of timestamps, while the first job is being performed, wherein the storage controller is configured for performing the second job from the plurality of jobs having a second operation with respect to the at least one non-volatile memory, immediately after the first job is complete wherein the timestamp updater is further configured ter post-compensating the first timestamp for the first job while the second job is being performed, wherein the scheduler is further configured for pre-updating a second timestamp for the second job after the timestamp updater has post-compensated the first timestamp.

18. The storage device of claim 17, the scheduler comprising:

the pre-defined operation time table, which represents a relationship between a plurality of operations of the storage device with respect to the at least one non-volatile memory and expected operation times thereof;

a timestamp updater connected to the pre-defined operation time table;

a timestamp buffer connected to the timestamp updater; and a job selector connected to the timestamp buffer;

wherein the job selector is configured to receive a plurality of scheduling requests to the storage device while the first job is being performed by the storage device.

19. The storage device of claim 17, the scheduler comprising:

a job selector configured for receiving a plurality of first scheduling requests;

a timestamp buffer configured for storing a plurality of first timestamps associated with the plurality of first scheduling requests;

a timestamp updater configured for updating the plurality of first timestamps based on the pre-defined operation time table, which represents a relationship between a plurality of operations of the storage device and expected operation times thereof, wherein the job selector is configured for performing a first scheduling operation for selecting the first job from the plurality of jobs based on the plurality of first scheduling requests and the plurality of first timestamps, wherein the job selector is further configured for receiving a plurality of second scheduling requests and a plurality of second timestamps associated with a second job to be performed subsequent to the first job, while the first job is being performed, wherein the job selector is further configured for performing a second scheduling operation for selecting the second job based on the plurality of second scheduling requests and the plurality of second timestamps, while the first job is being performed, wherein the storage device is configured for performing the second job selected by the second scheduling operation, immediately after the first job is completed, wherein the timestamp updater is further configured for updating a second timestamp for the second job among the plurality of second timestamps based on the pre-defined operation time table, while the second job is being performed and after the first timestamp is post-compensated, wherein each plurality of timestamps corresponds to a plurality of job performers to which different weights are assigned, and wherein the operation times of the plurality of operations of the storage device that are included in the pre-defined operation time table are set differently for the plurality of job performers based on the different weights.

20. The method of claim 16, further comprising pre-performing the scheduling operation for selecting the second job, including:

searching the second timestamp having a minimum value by comparing the plurality of timestamps with each other; and selecting a job associated with a scheduling request corresponding to the second timestamp among the plurality of scheduling requests as the second job, wherein the first timestamp and the second timestamp are the same as each other.

* * * * *